(12) United States Patent
Hanna et al.

(10) Patent No.: US 6,228,213 B1
(45) Date of Patent: May 8, 2001

(54) PRODUCTION OF MICROCRYSTALLINE CELLULOSE BY REACTIVE EXTRUSION

(75) Inventors: Milford Hanna, Lincoln; Gerald Biby, Omaha; Vesselin Miladinov, Lincoln, all of NE (US)

(73) Assignee: University of Nebraska-Lincoln, Lincoln, NE (US)

( * ) Notice: Subject to any disclaimer, the term of this patent is extended or adjusted under 35 U.S.C. 154(b) by 0 days.

(21) Appl. No.: 09/154,376

(22) Filed: Sep. 16, 1998

Related U.S. Application Data

(60) Provisional application No. 60/059,398, filed on Sep. 19, 1997.

(51) Int. Cl.⁷ .................................................... D21C 3/26
(52) U.S. Cl. ............................... 162/18; 162/19; 162/21; 162/22; 162/26; 162/29; 162/52; 162/76; 162/78; 162/87; 162/89; 162/90; 127/37; 426/276
(58) Field of Search ................................. 162/18, 19, 21, 162/22, 26, 29, 52, 76, 78, 87, 89, 90; 127/37; 426/276

(56) References Cited

U.S. PATENT DOCUMENTS

| | | |
|---|---|---|
| 3,954,727 | 5/1976 | Toshkov et al. . |
| 4,645,541 | 2/1987 | DeLong . |
| 4,728,367 * | 3/1988 | Huber et al. ............................ 127/1 |
| 4,908,099 * | 3/1990 | DeLong ................................ 162/21 |
| 5,106,888 | 4/1992 | Kosinski . |
| 5,879,463 * | 3/1999 | Proencal ............................... 127/37 |

* cited by examiner

Primary Examiner—Stanley S. Silverman
Assistant Examiner—Mark Halpern
(74) Attorney, Agent, or Firm—Shook, Hardy & Bacon LLP

(57) ABSTRACT

This process involves feeding cellulose into an extruder with an acid solution. The extruder is comprised of a screw and a barrel. The screw is rotated so as to pressurize the cellulose, and the cellulose undergoes acid hydrolysis and forms microcrystalline cellulose. The invented process can be accomplished by using pure cellulose or a lignocellulosic material as the starting material. If a lignocellulosic material is used, then a basic solution is added to it and the lignocellulosic material is fed through an extruder so as to obtain a mixture comprising lignin, hemicellulose and cellulose. The lignin and hemicellulose are extracted and the remaining cellulose is processed, as discussed previously, to form microcrystalline cellulose.

28 Claims, No Drawings

PRODUCTION OF MICROCRYSTALLINE CELLULOSE BY REACTIVE EXTRUSION

CROSS-REFERENCE TO RELATED APPLICATIONS

This application claims priority benefits under Title 35, United States Code § 119(e) of U.S. Provisional Application No. 60/059,398, filed Sep. 19, 1997.

STATEMENT REGARDING FEDERALLY SPONSORED RESEARCH OR DEVELOPMENT

Not applicable.

BACKGROUND OF THE INVENTION

The present invention relates to a process for making microcrystalline cellulose (MCC). More specifically, the present invention relates to a process where microcrystalline cellulose is made by reactive extrusion.

Microcrystalline cellulose is obtained by hydrolysis of the amorphous portion of cellulose until a level-off degree of polymerization (LODP) product is obtained. MCC is comprised of highly crystalline regions of cellulose and usually has a LODP of 200–300.

Microcrystalline cellulose is useful for a number of different applications. Pieces of microcrystalline cellulose easily bond together without the use of an adhesive. Furthermore, MCC can be mixed with other substances so as to hold an additive while bonding to itself. It can be made into pharmaceutical-grade tablets, such as vitamins, pain relievers, and other medicines. It also may be used as a substitute for starch where starch is used as a smoothener, such as in suntan lotion.

The hydrolysis of cellulose to obtain MCC can be accomplished using mineral acid, enzymes or microorganisms. Although enzymatic methods are desirable because glucose, a useful by-product, is created, these methods are more expensive and create MCC products having a lower crystallinity. Thus, acid hydrolysis is the conventional method of choice for manufacturing MCC.

In conventional methods, MCC is formed by reacting cellulose with acid in a batch-type reaction vessel. Specifically, a large amount of acid solution is placed in a vat and then cellulose is added. Next, the acid hydrolyzes the cellulose, and MCC is formed. Such processes require significantly greater amounts of acid solution than cellulose. When this batch-type process is complete, a large amount of acid solution remains.

Acids that can be used in this process include hydrochloric acid, sulfuric acid, and phosphoric acid. At higher temperatures, sulfuric acid and phosphoric acid can peptize and surface modify (esterify) MCC. However, such MCC is difficult to purify and does not have the same visual and functional properties as underutilized cellulose produced with hydrochloric acid. One example of using hydrochloric acid involves a method using 2.5N hydrochloric acid, which is able to specifically cleave, 1–4 glucosidic linkages. More product can be created with such hydrochloric acid than with sulfuric acid at the same conditions. However, if used at high concentrations, hydrochloric acid is a strong corrosive agent.

MCC obtained by acid hydrolysis using conventional methods has a particle size of about 200 microns, although particle size can vary somewhat depending on the starting material used. The MCC can undergo mechanical grinding until the particles are of a desirable size.

Mechanical grinding can be accomplished by mixing the MCC with a water solution in either a blender or in a hammer mill. The MCC particle shape obtained after grinding depends mostly on the nature of the raw starting material, especially upon whether the cellulose is in its native or regenerated state.

Conventional methods do not contemplate the advantage of using pressure and high shear forces created by an extruder to aid in performing this acid hydrolysis reaction. Methods presently available also have extremely harmful impacts on the environment because they require large amounts of acid and thus create significant quantities of acid waste.

A process for producing microcrystalline cellulose is needed that has a shorter reaction time than previous processes. Furthermore, a process is needed that is a continuous process rather than a batch-type process. Still further, a process using a limited amount of acid is needed. In addition, a process that is able to produce small particles of microcrystalline cellulose without the need for mechanical grinding also would be advantageous.

SUMMARY OF THE INVENTION

It is an object of the present invention to provide a process for producing microcrystalline cellulose by means of reactive extrusion in order to provide a quicker process for producing microcrystalline cellulose.

Another object of the present invention is to provide a continuous process for producing microcrystalline cellulose so that MCC may be produced in a quick and efficient manner.

It is a further object of the present invention to provide a process of producing MCC that uses less acid than previous processes so that less acid waste is created.

Another object of the present invention is to provide a process for producing small particles of MCC so that there is no need for mechanically grinding the particles produced.

A further object of the present invention is to provide a simple, economical, and environmentally-friendly process for producing microcrystalline cellulose so that microcrystalline cellulose may be created for a variety of applications.

According to the present invention, the foregoing and other objects are achieved by a process for producing microcrystalline cellulose by means of reactive extrusion. This process can be a one-step process if pure cellulose is used as a starting material and is a two-step process if a lignocellulosic material is used as the starting material.

In the first step of this process, the lignocellulosic material is extruded with a basic aqueous solution in order to destroy the lignocellulosic complex. The lignocellulosic complex is broken into lignin, hemicellulose, and cellulose. Following extrusion, the lignin and the hemicellulose are extracted with a heated basic solution, and the remaining cellulose is washed. The cellulose can be bleached or further processed to microcrystalline cellulose without bleaching.

In the second step of this process, pure cellulose or the cellulose obtained from the lignocellulosic material undergoes reactive extrusion. The cellulose material is fed into an extruder with an acid solution. The cellulose, which is pressurized by the screw of the extruder, is hydrolyzed by the acid. After extrusion, the resulting microcrystalline cellulose product is washed, bleached and dried. The size of the resulting microcrystalline cellulose particles depends on the starting material used and the extrusion conditions.

Additional objects, advantages and novel features of the invention will be set forth in part in the description which follows, and in part will become apparent to those skilled in the art upon examination of the following, or may be learned from practice of the invention. The objects and advantages of the invention may be realized and attained by means of the instrumentalities and combinations particularly pointed out in the appended claims.

DETAILED DESCRIPTION OF THE PREFERRED EMBODIMENT

The invented process for manufacturing microcrystalline cellulose involves the following two steps if a lignocellulosic material is used as the starting material and requires only the second step if pure cellulose is used as the starting material. In the first step of the process, the lignocellulosic material is extruded with a basic aqueous solution in order to destroy the lignocellulosic complex. The lignocellulosic complex is broken into lignin, hemicellulose, and cellulose. Preferably, the basic aqueous solution is comprised of sodium hydroxide having a concentration ranging from about 4 to 12% (w/w). Preferably, the moisture content of the lignocellulosic material ranges from about 40% to 250% on a dry basis (db). Following extrusion, the lignin and hemicellulose are extracted with a basic solution, and the remaining cellulose is washed. Preferably, the lignin and hemicellulose are extracted with a hot sodium hydroxide solution. If desired, the cellulose, which results from the extruded lignocellulosic material, can be bleached. Bleaching can be accomplished with, for example, hydrogen peroxide or sodium hypochloride. However, it is not necessary to bleach the cellulose before further processing it into microcrystalline cellulose.

The second step of the invented process involves producing microcrystalline cellulose from cellulose. This involves breaking a large cellulose molecule into smaller molecules. If pure cellulose is used as the starting material, then this is the only step necessary for the invented process. This step involves a hydrolysis reaction where an acid acts as a catalyst for the hydrolysis. An acid solution is sprayed or poured on a cellulose-containing material, and then this acid-covered cellulose is fed through an extruder. In the alternative, cellulose and an acid solution are simultaneously fed into an extruder. Preferably, the moisture content of the cellulosic material before extrusion is in the range of about 40% to 250% on a dry basis (db). Preferably, a strong acid such as hydrochloric acid, sulfuric acid, or nitric acid is used, and that acid has a concentration of about 1 to 5% (w/w). Most preferably, sulfuric acid having a concentration of between about 1.5 and 2.5% (w/w) is used. It is desirous to use sulfuric acid because it is less corrosive than other strong acids yet is still quite effective because of the aggressiveness of the extrusion process.

Since there are different heating zones on an extruder, different heating regimes may be used. Both the barrel and the die of the extruder can be heated or one can be heated or neither can be heated. Different heating regimes, especially with respect to the second step of the invented process, affect the resulting particle size of the MCC product. Preferably, in the first step where cellulose is obtained from lignocellulosic material, the extruder barrel and die temperatures for this first step range from about 90° C. to 200° C. Most preferably, the temperature of the extruder in the first step is between about 140° C. and 170° C. Preferably, in the second step where cellulose is hydrolyzed to form MCC, the temperature of the extruder barrel during this step ranges from about 80° C. to 200° C. and the die is not heated. Most preferably, the temperature of the barrel in the second step is approximately 140° C.

The second step of the invented process, the acid hydrolysis step, can be accomplished in multiple steps if desired. This involves feeding the cellulose through the extruder multiple times or feeding the cellulose through a sequence of extruders. For instance, it can be a two-stage acid hydrolysis, thus allowing a smaller extruder to be used. The number of stages required to accomplish the acid hydrolysis depends upon the size of the extruder barrel and screw. Still further, the invented process can be accomplished as either a continuous process or a batch-type process. Preferably, this process is a continuous process.

Although the same chemical reaction takes place in the invented process as in conventional processes, the environment of the reaction is entirely different. Because of the temperature of the extruder and the pressure created by the die or screw of the extruder, the cellulose in the extruder basically melts. This allows more intimate contact between the cellulose and the acid. As a result, the acid requirement for the invented process is substantially less and, in fact, is insignificant compared to conventional batch-type processes that require excess water and acid. The ratio of acid solution to cellulose in the invented process is approximately 1:1 whereas conventional processes may have acid solution to cellulose ratios of between about 5:1 and 8:1. Still further, the high pressure applied by the extruder creates high shear forces and allows the reaction to be accomplished in a much shorter time as compared with conventional technology.

After the extrusion, the microcrystalline cellulose product is neutralized, washed, bleached and dried. The excess acid from the hydrolysis reaction combines with the alkaline stream used to neutralize the product so that all of the waste from this process is neutralized before it is disposed. Preferably, the alkaline stream is obtained from the basic solution used in breaking down the lignocellulose into cellulose and lignin. Most preferably, the microcrystalline cellulose product is neutralized with sodium hydroxide.

If the starting product is pure cellulose, then there is no lignin waste, and all that must be done after the hydrolysis to complete the process is neutralization. However, if dirty material such as corn cobs is used, then a washing step must be done to wash out the lignin. A conventional batch-type process requires about 60% more washing than the continuous process of the present invention, which involves using an extruder.

Next, the neutralized and washed product is bleached. The final product can be bleached with sodium hypochloride or hydrogen peroxide. Preferably, if sodium hypochloride is used, it has a concentration of about 5.25% (w/w), and if hydrogen peroxide is used, it has a concentration of about 9.30% (w/w). However, if pure cellulose is the starting material, then it is not necessary to go through the bleaching step since the pure cellulose is already pre-bleached. In contrast, if a cellulosic material such as corn cobs is used, the MCC product must be bleached in order to obtain a white product.

After being bleached, the product is dried. The invented process, which involves using an extruder, has a lower drying time because it requires less washing and because the process need not be stopped to allow for drying time. A spray dryer may be used in commercial applications to dry the microcrystalline cellulose product of the present invention. A spray dryer is comprised of a vertical cylinder with a conical bottom. The spray dryer has a nozzle that sprays a slurry of MCC into the spray dryer and a hot air stream that sprays into the spray dryer. Typically, the hot air enters at the bottom of the chamber and is sprayed upward. The MCC particles are atomized so that the hot air of the spray dryer is able to contact more surface area of the MCC. The spray dryer needs to be at a temperature higher than about 100° C. so as to evaporate the water. The hot air stream of the spray dryer must have a velocity that is less than the terminal velocity of the MCC so as not to carry the particles. The spray dryer used in the process is a conventional spray dryer. The MCC product is not altered by the heat of the spray dryer.

Microcrystalline cellulose can be made from any material that is high in cellulose. Although cellulose is in all plant matter, plants having higher cellulose concentrations are especially desirable. Pure cellulose, commercial-grade cellulose or a lignocellulosic material can be used in the process of the present invention. Examples of lignocellulosic materials that can be used include wood, cotton, or agricultural residues such as soy bean hulls, oat hulls, rice hulls, corn cobs, corn stalks, bagasse, wheat straw, barley straw, oat straw, and sugar beet pulp. If these lignocellulosic materials are used as a source of cellulose, preferably, they are chopped up and processed into a powder before being used.

Any extruder screw design may be used in the invented process. Different screws may be selected to obtain different desired compression ratios. Preferably, the extruder has an acid-resistant barrel and screw, and the extruder screw has a compression ratio of between approximately 1.5:1 and 3:1. Most preferably, the compression ratio is about 3:1. Also, different screw configurations provide different types of mixing. Some examples of screw designs include those with no mixing sections, one mixing section, and two mixing sections. There is not a significant difference between mixing versus non-mixing designs as used in the present invention.

Still further, MCC can be manufactured by using single or twin screw extruders. If a single screw extruder is used, it is preferable that it has a single mixing zone, a 1.5:1 compression ratio screw, and a non-heated die attachment. Single screw extruders also may be used in the first step of the invented process, such as for breaking the lignocellulose complex of soybean hulls and corn cobs wherein cellulose may then be recovered by alkali extraction. One particular example of an acceptable lab-scale apparatus is a Brabender single screw extruder (Model 2003 GR-8) which may be obtained from C. W. Brabender Instruments, Inc., a German owned company, located in South Hackensack, N.J. An example of a commercially acceptable extruder is the Insta-Pro R 2000 extruder, which may be obtained from Tripe F Manufacturing located in Des Moines, Iowa.

Although a single screw extruder performs adequately for the above mentioned purposes, preferably, a twin screw mixer is used. A twin screw mixer provides a more stable flow, easier feeding, and better control over the process. This is attributed to the positive pumping effect and lack of compression caused by the twin screw mixer.

The size of the microcrystalline cellulose particles obtained through this process depends mostly on the source of the cellulose used and to some extent on the conditions of the acid hydrolysis. MCC particles that are considerably smaller than 200 microns can be created by the process of the present invention. Generally, harsher hydrolysis conditions, such as higher temperatures and higher acid concentrations, allow the creation of MCC having a smaller particle size. The speed of the extruder screw (rpm) also affects particle size. Increased mixing increases the hydrolysis and decreases the resulting particle size of the MCC.

Furthermore, the size of the MCC corresponds approximately with the measured LODP of the starting material. For instance, the measured LODP of wood-cellulose microcrystals is 220 whereas the LODP of the cellulose in rayon-tirecord microcrystals is only about 30, and wood-cellulose forms larger MCC particles. Microcrystalline cellulose obtained from using corn cobs as the source of cellulose has a smaller particle size than that obtained from woodcellulose, and MCC produced from soybean hulls has an even smaller size. Different cellulose sources also affect the crystallinity of the MCC.

Reactive extrusion is an environmentally-friendly process because the waste product is virtually non-existent when the starting material is pure cellulose. Still further, if corn cobs or soybean hulls are used, the process is environmentally-friendly in that a use is being found for recycling such waste products.

To be marketable, tablets made out of microcrystalline cellulose must be somewhat break resistant. In other words, they must be able to be dropped from a certain height without breaking. Nevertheless, these tablets must be able to dissolve in one's stomach within approximately 20 minutes after being ingested. The MCC product made by the reactive extrusion process of the present invention can be made into tablets that meet these requirements.

The extrusion process discussed above was scaled up to determine its usefulness in commercial applications. It was found that any type of screw also worked in the scaled-up process. In addition, it was found that the scaling-up of this process did not affect the product produced by this process. The following is an example of a scaled-up process for producing microcrystalline cellulose which is within the scope of this invention. This example is not meant in any way to limit the scope of this invention.

Extrusion of Corn Cobs on a Commercial Scale Single Screw Extruder.

An Insta-Pro R 2000 commercial single screw extruder (capable of processing 2000 pounds per hour) was used to manufacture microcrystalline cellulose (MCC) from corn cobs on a commercial scale process. During the first step, corn cobs were extruded in the extruder with a water solution of sodium hydroxide in order to destroy the lignocellulosic complex. The concentration of the sodium hydroxide was 10% w/w of the dry weight of the corn cobs, and the initial moisture content was in the range 50 (db). The preheating before extrusion with direct steam injection resulted in moisture content increased with 10 db. The temperature of the first section of the extruder reached 200° F. In the second section of the extruder, the temperature was 250° F. This extruder did not have a heating jacket but was heated through mechanical friction. After the extrusion, the lignin, lipids and the hemicellulose were extracted with hot water and the remaining cellulose was washed ten times. The cellulose was then dried. The yield of the cellulose from the corn cobs was 39.48% db.

MCC was produced by extrusion of the cellulose with a sulfuric acid solution in an Insta-Pro R 2000 commercial single screw extruder. The concentration of the sulfuric acid was 2.0 (w/w), and the moisture content of the material before extrusion was 60% (db). The temperature of the first section of the extruder was 200° F. and of the second section was 230° F. The resulting MCC was washed, bleached and dried in a spray dryer. The yield of MCC was 70% of the cellulose.

From the foregoing, it will be seen that this invention is one well adapted to attain all the ends and objects hereinabove set forth together with other advantages which are obvious and which are inherent to the process. It will be understood that certain features and subcombinations are of utility and may be employed without reference to other features and subcombinations. This is contemplated by and is within the scope of this invention. Since many possible embodiments may be made of the invention without departing from the scope thereof, it is to be understood that all matter herein set forth is to be interpreted as illustrative and not in a limiting sense.

We claim:

1. A process for producing microcrystalline cellulose, comprising:

adding an acid solution to cellulose; and feeding said cellulose and said acid solution through an extruder, wherein said cellulose undergoes acid hydrolysis and forms microcrystalline cellulose.

2. A process as in claim 1, wherein said acid is added to said cellulose while said cellulose is fed through said extruder.

3. A process as in claim 1, wherein said cellulose has a moisture content in the range of about 40% to 250% on a dry basis (db) before extrusion.

4. A process as in claim 1, wherein said process is a continuous process.

5. A process as in claim 1, wherein said cellulose is fed through said extruder multiple times.

6. A process as in claim 1, wherein said cellulose is fed through a sequence of extruders.

7. A process as in claim 1, wherein said acid solution is comprised of sulfuric acid, hydrochloric acid, or nitric acid.

8. A process as in claim 1, wherein the concentration of said acid solution is about 1 to 5% (w/w).

9. A process as in claim 1, wherein said extruder is comprised of a barrel and the temperature of said barrel is between about 90° C. and 200° C.

10. A process as in claim 1, wherein said extruder is comprised of a screw and said screw has a compression ratio between approximately 1.5:1 and 3:1.

11. A process as in claim 1, wherein said extruder is a twin screw extruder.

12. A process as in claim 1, wherein the ratio of amount acid solution to cellulose used in the process is approximately 1:1.

13. A process as in claim 1, further comprising:

neutralizing said microcrystalline cellulose.

14. A process as in claim 1, wherein said extruder is comprised of a screw and a barrel and wherein said screw is rotated so as to pressurize said cellulose before it undergoes hydrolysis and forms microcrystalline cellulose.

15. A process for producing microcrystalline cellulose from a lignocellulosic material, comprising:

adding a basic solution to a lignocellulosic material;

feeding said lignocellulosic material and said basic solution through an extruder so as to obtain a mixture comprising lignin, hemicellulose and cellulose;

extracting said lignin and said hemicellulose from said cellulose;

washing said remaining cellulose;

adding an acid solution to said cellulose; and feeding said cellulose and said acid solution through an extruder, wherein said cellulose undergoes acid hydrolysis and forms microcrystalline cellulose.

16. A process as in claim 15, further comprising:

mixing the said basic solution with the said acid solution before disposing of said solutions.

17. A process as in claim 16, further comprising:

neutralizing said microcrystalline cellulose;

washing said microcrystalline cellulose;

bleaching said microcrystalline cellulose; and drying said microcrystalline cellulose.

18. A process as in claim 17, wherein said microcrystalline cellulose is bleached with a sodium hypochloride solution or a hydrogen peroxide solution.

19. A process as in claim 17, wherein said microcrystalline cellulose is dried by using a spray dryer.

20. A process as in claim 15, wherein said acid is added to said cellulose while said cellulose is fed through said extruder.

21. A process as in claim 15, wherein said lignin and said hemicellulose are extracted with a hot sodium hydroxide solution.

22. A process as in claim 15, wherein said lignocellulosic material is wood, cotton, soy bean hulls, oat hulls, rice hulls, corn cobs, corn stalks, bagasse, wheat straw, barley straw, oat straw, or sugar beet pulp.

23. A process as in claim 15, wherein said extruder is comprised of a barrel and the temperature of said barrel is between about 80° C. and 200° C. while the lignocellulosic material is fed through said extruder.

24. A process as in claim 15, wherein said extruder is comprised of a barrel and the temperature of said barrel is between about 90° C. and 180° C. while said cellulose undergoes said hydrolysis.

25. A process as in claim 15, wherein said extruder is comprised of a screw and said screw has a compression ratio between approximately 1.5:1 and 3:1.

26. A process as in claim 15, wherein said extruder is a twin screw extruder.

27. A process as in claim 15, wherein the ratio of acid solution to cellulose is approximately 1:1.

28. A process for producing microcrystalline cellulose, comprising:

extruding cellulose at an elevated temperature and pressure; and hydrolyzing said cellulose to form microcrystalline cellulose.

* * * * *